Oct. 12, 1926.
H. O. HEM
1,602,610
PREDETERMINED WEIGHT SCALE
Filed April 14, 1922
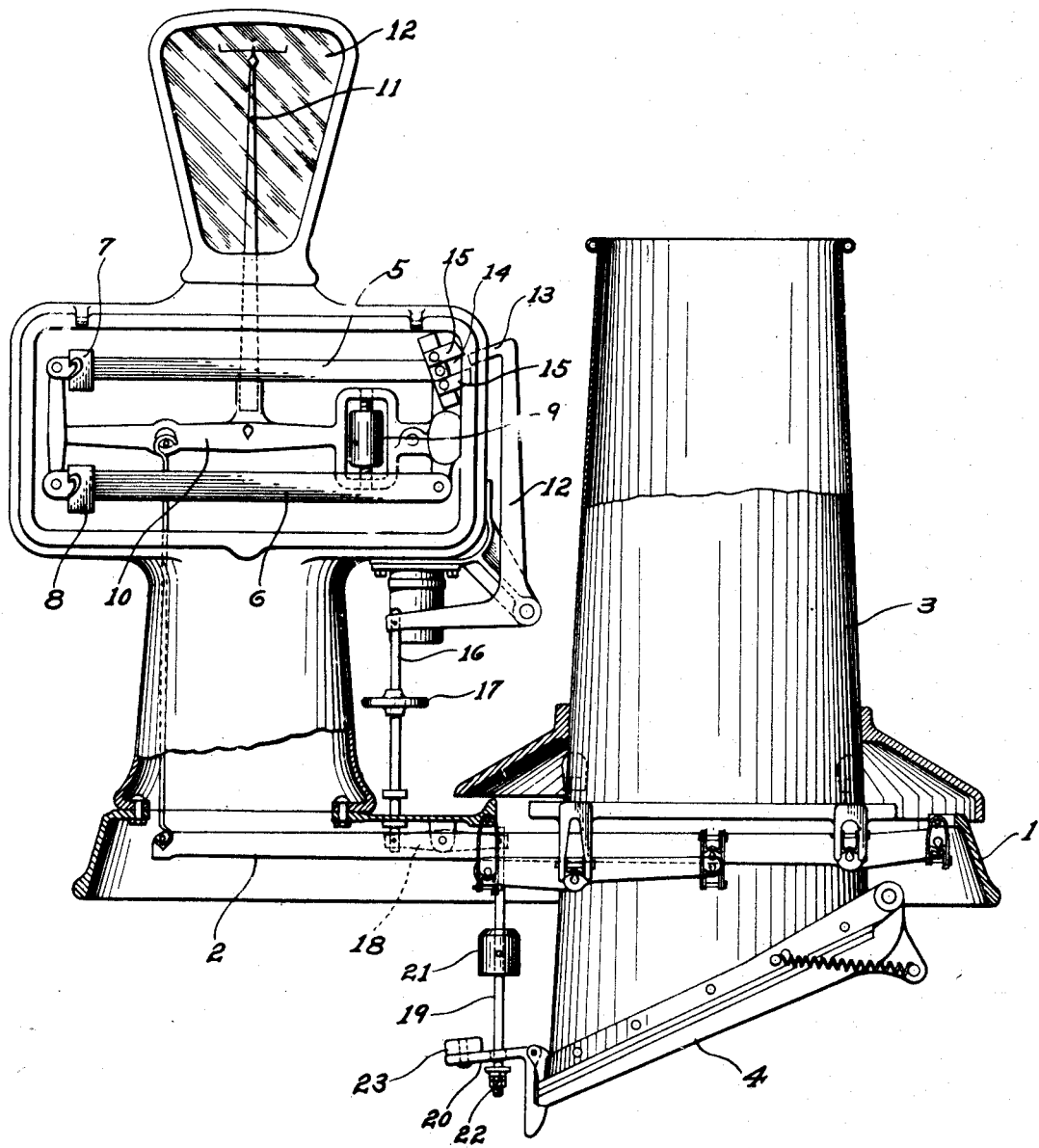
Inventor
Halvor O. Hem.
By C. C. Marshall.
Attorney Patented Oct. 12, 1926.

1,602,610

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

PREDETERMINED WEIGHT SCALE.

Application filed April 14, 1922. Serial No. 552,571.

This invention relates to weighing scales, and particularly to scales of the predetermined weight type, and one of the principal objects of the invention is to provide means whereby the commodity-receiver of the scale may be conveniently emptied only when the scale mechanism is balanced in a predetermined position.

Another object of the invention is to provide a hopper scale having means for discharging the hopper which is operative only when the weighing mechanism of the scale is balanced in a predetermined position.

Other objects and advantages will be apparent from the following description, in which reference is had to the accompanying drawing illustrating a preferred embodiment of my invention and wherein similar reference numerals designate similar parts in the figure.

In the drawing:—

The figure is an elevational view, with parts broken away and parts shown in section, of a scale embodying my invention.

I have illustrated my invention as applied to a scale of the type shown, described and claimed in my co-pending application Ser. No. 477,152, filed June 13, 1921. The base 1 of the scale supports and houses the platform levers 2, which in turn support a hopper or receptacle 3.

The hopper or receptacle 3 is provided at its lower end with a hinged plate or door 4. In order to insure the complete discharge of the hopper when the plate or door 4 is opened, the walls of the hopper are tapered upwardly so that the hopper is larger at the bottom than at the top.

The counterbalancing mechanism of the scale consists of a pair of beams 5 and 6 upon which are slidably mounted poises 7 and 8, and a counterweight 9, all supported upon a lever 10 which is equipped with a predetermined weight indicator 11 that cooperates with a suitable chart 12. Since the scale is of the predetermined weight type, the indicator 11 always stands at the same point when the scale is balanced in weighing position.

In using the scale the poises 7 and 8 are moved to the positions on the beam in which they will counterbalance a desired weight of dried fruit or other commodity, and enough of such commodity is placed in the hopper 3 to bring the indicator 11 to the predetermined weighing position. The door 4 at the bottom of the hopper 3 is then opened and the contents of the hopper are discharged into the box or other container in which the commodity is to be packed.

In order to prevent the operator of the scale from readily opening the door 4 when the weight of the commodity in the hopper is greater or less than the predetermined weight for which the scale is set, I have provided a device for releasing the door, which comprises a bell crank lever 12 having a finger 13 adapted, when the lever 10 is in exact predetermined weighing position, to move into an opening 14 between stops 15 fixed to the lever 10. Pivotally connected to the lower horizontally extending arm of the bell crank lever 12 is a link 16 upon which is mounted a disk 17 against which the hand of the operator may rest when he graps the portion of the link 16 above the disk. Pivotally supported in the base of the scale is a short lever 18 of the first order, one end of which is connected to the link 16, the other end being connected to a link 19 which depends from the lever 18 and passes through an opening in a pivoted latch member 20. A weight 21 fixed upon the link 19 serves to hold the link 19, lever 18, link 16 and bell crank lever 12 in the position in which they are shown in the drawing, with the finger 13 withdrawn from the opening 14. If, while the scale is in predetermined weighing position, the operator grasps the link 16 and forces it downwardly, the bell crank lever 12 is swung about its fulcrum, the finger 13 moving into the opening, the lever 18 is rocked about its fulcrum and the link 19 drawn upwardly, bringing a stop 22 on the lower end of the link 19 into engagement with the pivoted latch 20, so that the lever is rocked on its pivot and the door 4 is released. The contents of the hopper may thus be discharged when the scale is in predetermined weighing position. If, however, the operator attempts to move the link 16 downwardly when the scale is not in predetermined weighing position, the finger 13 will engage one of the stops 15 before the stop 22 engages the latch 20, and opening of the door 4 will thus be prevented.

After the contents of the hopper have been discharged, the operator releases the link 16 and the bell crank lever and parts connected thereto are returned to the position in which they are shown in the drawing by the downward pull of the weight 21. The door 4 may then be swung shut. When it strikes the latch 20 the latch may, because of the lost motion connection between the latch and the link 19, swing on its pivot without disturbing the releasing mechanism, and when the door has been swung into closed position the latch will be returned by the weight 23 to operative position. The scale is thus made ready for another weighing operation.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a commodity-receiver, load-offsetting mechanism, means operatively connecting said commodity-receiver to said load-offsetting mechanism to weigh the contents of said commodity-receiver, means for discharging said commodity-receiver, means for preventing the operation of said discharging means, and means whereby said load-offsetting mechanism controls the operation of said preventing means to prevent the operation of said discharging means except when said load-offsetting mechanism is in predetermined balanced position.

2. In a weighing scale, in combination, a commodity-receiver, load-offsetting mechanism connected thereto, manually operated means for discharging said commodity-receiver, stop means for preventing the operation of said discharging means, and means whereby said load-offsetting mechanism controls said stop means to prevent the operation of said discharging means except when said load-offsetting mechanism is in predetermined balanced position.

3. In a weighing scale, in combination, a commodity-receiver, platform lever mechanism, load-offsetting mechanism connected thereto, a hopper supported by said platform lever mechanism, manually operated means for opening said hopper to discharge the contents thereof, means for preventing the operation of said manually operated means, and means whereby said preventing means is controlled by said load-offsetting mechanism to prevent the operation of said manually operated means except when said load-offsetting mechanism is in predetermined position.

4. In a weighing scale, in combination, a frame, a commodity-receiver, a weighing beam connected thereto, means for discharging said commodity-receiver, stop means on said beam, and a member movably mounted on said frame and connected to said commodity-receiver discharging means, said member being engageable with said stop means except when said weighing beam is in predetermined position.

5. In a weighing scale, in combination, a frame, lever mechanism supported by said frame, a commodity-receiver supported by said lever mechanism, a weighing beam connected to said weighing mechanism, manually-operated means for discharging said commodity-receiver, stop means on said beam, and a member mounted on said frame and connected to said manually-operated commodity-receiver discharging means and engageable with said stop means except when said beam is in predetermined position.

6. In a weighing scale, in combination, a frame, lever mechanism supported by said frame, a commodity-receiver supported by said lever mechanism, a weighing beam connected to said weighing mechanism, manually-operated means for discharging said commodity-receiver, stop means on said beam, and a lever mounted on said frame and having a finger engageable with said stop means except when said beam is in predetermined position.

7. In a weighing scale, in combination, a frame, lever mechanism supported by said frame, a commodity-receiver supported by said lever mechanism, a weighing beam connected to said weighing mechanism, manually-operated means for discharging said commodity-receiver, a pair of spaced stops on said beam, and a bell crank lever mounted on said frame and having a finger engageable with said stops when said beam is not in predetermined position and movable into the space between said stops when said beam is in predetermined position.

8. In a weighing scale, in combination, load-offsetting mechanism, a hopper connected thereto, a closure for the lower end of said hopper, a latch for holding said closure in closed position, link mechanism for operating said latch, and means for preventing the operation of said link mechanism except when said load-offsetting mechanism is in predetermined position.

HALVOR O. HEM.